(12) United States Patent
Hu et al.

(10) Patent No.: US 11,480,506 B2
(45) Date of Patent: Oct. 25, 2022

(54) SOFT ROCK SHEAR RHEOLOGICAL TEST SYSTEM WITH SIMULATION OF COUPLED RAINFALL SEEPAGE AND BLASTING VIBRATIONS

(71) Applicant: Wuhan University of Science and Technology, Wuhan (CN)

(72) Inventors: Bin Hu, Wuhan (CN); Liyao Ma, Wuhan (CN); Jianlong Sheng, Wuhan (CN); Guangquan Zhang, Wuhan (CN); Shibing Huang, Wuhan (CN); Shuxiang Chang, Wuhan (CN); Jing Ding, Wuhan (CN); Ji Liu, Wuhan (CN)

(73) Assignee: WUHAN UNIVERSITY OF SCIENCE AND TECHNOLOGY

( * ) Notice: Subject to any disclaimer, the term of this patent is extended or adjusted under 35 U.S.C. 154(b) by 161 days.

(21) Appl. No.: 17/078,112

(22) Filed: Oct. 23, 2020

(65) Prior Publication Data
US 2021/0123841 A1  Apr. 29, 2021

(30) Foreign Application Priority Data

Oct. 25, 2019 (CN) .......................... 201911022745.7

(51) Int. Cl.
*G01N 3/24* (2006.01)
*G01N 3/02* (2006.01)

(52) U.S. Cl.
CPC ................. *G01N 3/24* (2013.01); *G01N 3/02* (2013.01); *G01N 2203/0025* (2013.01); *G01N 2203/0058* (2013.01); *G01N 2203/0236* (2013.01)

(58) Field of Classification Search
CPC ........ G01N 33/222; G01N 3/34; G01N 11/14; G01N 3/06; G01N 19/02; G01N 19/04; G01N 3/567; G01N 3/04; G01N 3/313; G01N 3/14; G01N 3/18; G01N 15/0826; G01N 3/36; G01N 15/08; G01N 1/286; G01N 3/02; G01N 3/38; G01N 3/28; G01N 3/10; G01N 1/28; G01N 1/08;
(Continued)

(56) References Cited

U.S. PATENT DOCUMENTS

2005/0150273 A1* 7/2005 Potter ...................... G01N 3/10
73/38

FOREIGN PATENT DOCUMENTS

CN          203241300 U   * 10/2013
CN          206470160 U   *  9/2017

* cited by examiner

*Primary Examiner* — Brandi N Hopkins
(74) *Attorney, Agent, or Firm* — Syncoda LLC; Feng Ma

(57) ABSTRACT

The disclosure relates to a soft rock shear rheological test system with simulation of coupled rainfall seepage and blasting vibrations, which is at least provided with a loading device and a shear box. The loading device includes a frame (2), a normal static load electric cylinder (1) disposed on a top of the frame (2) and a normal dynamic load electric cylinder (16) disposed on a lower portion of the frame (2), a horizontal static load electric cylinder (5) and a horizontal dynamic load electric cylinder (12) disposed on both sides of the frame (2), and a reaction post (10). This test system can perform a dry-wet cycle operation on the test specimen without disassembling the shear box during the shear rheological test, and can truly simulate influences of rainfall seepage and blasting vibrations on the shear rheological effect of soft rock.

7 Claims, 7 Drawing Sheets

(58) Field of Classification Search
CPC .......... G01N 11/00; G01N 3/068; G01N 3/00; G01N 3/307; E21B 43/26; G01M 99/008; G01M 99/00
See application file for complete search history.

SOFT ROCK SHEAR RHEOLOGICAL TEST SYSTEM WITH SIMULATION OF COUPLED RAINFALL SEEPAGE AND BLASTING VIBRATIONS

CROSS-REFERENCE TO RELATED APPLICATIONS

This application claims the priority of Chinese Patent Application No. 201911022745.7, filed with China Patent Office on Oct. 25, 2019, which is incorporated herein by reference in its entirety.

TECHNICAL FIELD

The present disclosure relates to a test system, and in particular to a soft rock shear rheological test system with simulation of coupled rainfall seepage and blasting vibrations.

BACKGROUND OF THE DISCLOSURE

Weak interlayer is an important structural form of shear sliding collapse of slope in open-pit mining, and its rheological mechanical property is one of most important factors affecting slope stability. Under combined effect of three factors of blasting vibrations, rainfall seepage and dry-wet cycle in mining process, shear rheological effect of the weak interlayer will increase significantly, and the resulting slope instability is one of most important research objects in mine safety issues. In order to simulate and predict change of the shear rheological effect of the weak interlayer under actual working conditions, most convenient and effective method is to use indoor shear rheological tests to obtain parameters of mechanical properties of soft rock under various conditions.

At present, a rock shear rheological test system is usually used for indoor tests to study rheological properties of the weak interlayer. However, existing rock shear rheological test system is difficult to simulate influence of coupling effect of rainfall seepage and blasting vibrations on test specimen. Generally, the problems regarding the existing shear rheological test system of a rock are as follows:

(1) When seepage shear box is injected with high-pressure water in the form of radial flow, and the high-pressure water is injected only via a single hole. Furthermore, specimen connectors inserted into a rock specimen and a normal load bearing block are integrally formed, resulting in that process of disassembling the rock specimen after a group of tests is tedious, and test efficiency is lower.

(2) During rock shear rheological test, although high-pressure water can be injected to increase water content of the rock specimen, the rock specimen cannot be quickly dried, so it is difficult to simulate a dry-wet cycle of the rock specimen under natural conditions.

(3) The size of a cavity used to place the rock specimen inside the seepage shear box is constant. There will be a certain gap after the rock specimen is placed in the cavity, which may cause the rock specimen to deflect during shearing process, thereby affecting direction of force applied on the rock specimen and reducing accuracy of test results.

(4) Upper shear boxes and lower shear boxes of the seepage shear box will produce sliding friction during the shearing process, which will not only cause energy loss, but more importantly, measured shearing strength of the rock specimen will be greater than actual shearing strength. Therefore, how to reduce the sliding friction is an urgent problem to be solved.

(5) During the rock shear rheological test, application of cyclic vibration load can well simulate influences of the blasting vibrations on the rock specimen under actual working conditions. At present, there is no test apparatus in the art for simulating the influences of the blasting vibrations on the shear rheological effect of the rock specimen during the shear rheological test in the world. For this reason, it is necessary to develop a soft rock shear rheological test system to simulate influences of coupled effect of rainfall seepage and blasting vibrations on the shear rheological effect of the rock specimen.

SUMMARY OF THE DISCLOSURE

The present disclosure is intended to overcome the above-mentioned disadvantages in the prior art and provides a soft rock shear rheological test system with simulation of coupled rainfall seepage and blasting vibrations, which can withstand high water pressure and has higher test accuracy and efficiency. Furthermore, it can easily and quickly realize a dry and wet cycle of a rock specimen, and can apply normal and tangential cyclic vibration loads to simulate effect of the blasting vibrations.

In order to achieve the above-mentioned object, in an aspect, the present disclosure provides the soft rock shear rheological test system with simulation of coupled rainfall seepage and blasting vibrations, which can be at least provided with a loading device and a shear box.

The loading device can includes a frame, a normal static load electric cylinder, a normal dynamic load electric cylinder, a horizontal static load electric cylinder, a horizontal dynamic load electric cylinder and a reaction post. A frame beam is disposed at the middle portion of the frame, and support legs are disposed at a bottom portion of the frame. The normal static load electric cylinder is disposed on a top of the frame, and the normal dynamic load electric cylinder is disposed on a lower portion of the frame. An indenter of the normal static load electric cylinder and an indenter of the normal dynamic load electric cylinder lie in a same central line. The horizontal static load electric cylinder and the horizontal dynamic load electric cylinder are disposed on both sides of the frame, and a indenter of the horizontal static load electric cylinder and a indenter of the horizontal dynamic load electric cylinder lie in a same central line. The reaction post is disposed right over the horizontal dynamic load electric cylinder.

The shear box includes an upper shear box, a lower shear box, a normal loading indenter, a normal load bearing block and specimen connectors. The upper shear box is formed by connecting a top plate and an upper shear body through hexagon socket head cap screws, and the lower shear box is formed by connecting a lower shear body and a bottom plate through hexagon socket head cap screws. The upper shear box and the lower shear box are tightly pressed together by a vertical roller shaft, and internal threaded connection holes are disposed on both sides of the lower shear box. Through holes are disposed on both sides of the upper shear box, and the vertical roller shaft passes through the through holes on both sides of the upper shear box and engages the lower shear box through the internal threaded connection holes. During shear rheological test, the vertical roller shaft is capable of moving with the lower shear box in a tangential direction within a range of the through hole. The upper shear boxes and lower shear boxes are fixedly connected to form a cuboid cavity inside inner walls of the upper shear boxes and the lower shear boxes for placing a test specimen. The upper shear box is in contact with one end of the reaction post, and the lower shear body of the lower shear box is at a same height as the indenter of the horizontal static load electric cylinder.

The top plate of the upper shear box is formed with a circular through hole, and the normal loading indenter passes through the circular through hole and presses on the normal load bearing block. A top portion of the normal loading indenter is formed with an upper groove for mortising a spherical universal indenter of the normal static load electric cylinder to apply a normal load. A lower portion of the normal loading indenter is provided with a lower groove for connecting the normal load bearing block, and the normal load bearing block has a protrusion shape. A projected head of the protrusion shape of the normal load bearing block is fitted in the lower groove of the normal loading indenter, and two shoulders of the normal load bearing block are in contact with the top plate of the upper shear box. Lateral sides of the normal load bearing block are in contact with inner walls of the upper shear body, and the normal loading indenter is provided with a inflow channel communicating with outside. The inflow channel turns into a horizontal water/air channel after the inflow channel is extended vertically downward from the normal loading indenter and enters the normal load bearing block. Outlets at both ends of the horizontal water/air channel are blocked with hexagonal socket head plugs, and three water/air holes are formed at equal intervals on a lower portion of the horizontal water/air channel. The specimen connectors are mounted in the three water/air holes. The specimen connectors and the water/air holes are all provided with chamfers, and a connector sealing ring is disposed on contact part of one end of the specimen connector and the water/air hole for sealing against high-pressure water/air. Another end of the specimen connector is directly mortised inside the test specimen.

The upper shear body is provided with a flat groove; the flat groove is at a connection of the upper shear body and the lower shear body, and surrounds the cuboid cavity. The flat groove serves to avoid damage to a shear surface of the test specimen, and water/air outflow channels communicating with outside of the shear box are disposed inside the flat groove.

A slide-rolling row is disposed below the lower shear box, and the slide-rolling row is provided with an upper sliding plate and a lower sliding plate. The upper sliding plate and the lower sliding plate are provided with ball holes for placing balls, and there is a rectangle hole in the middle of the slide-rolling row. Slide-rolling row barriers are disposed on both sides of the slide-rolling row, and the slide-rolling row barriers are fastened to both sides of the bottom plate through fastening screws to limit moving range of the slide-rolling row.

A rail mounting frame is fixed on the frame beam, and the rail mounting frame is provided with a moving rail. There is an opening in the middle of the frame beam. The normal dynamic load electric cylinder passes through the opening and the rectangular hole in the middle of the slide-rolling row, and then contact the bottom plate of the lower shear box.

In some embodiments of the present disclosure, three annular sealing rings are disposed between the top plate and the normal loading indenter for sealing between the top plate and the normal loading indenter so as to prevent leakage of high-pressure water/air from a connection between the top plate and the normal load bearing block. One sealing strip is disposed between bottom portion of the normal loading indenter and the normal load bearing block to seal between the normal loading indenter and the normal load bearing block, so as to prevent leakage of high-pressure water/air from a connection between the normal loading indenter and the normal load bearing block. There are rectangular sealing strips disposed between the top plate of the upper shear box and the upper shear body of the upper shear box, between the upper shear boxes and lower shear boxes, and between the lower shear body of the lower shear box and the bottom plate of the lower shear box.

In some embodiments of the present disclosure, large ball rows and ball barriers are disposed at both sides of the lower shear body for reducing friction between the upper shear box and the lower shear box, and the ball barriers are fastened to the lower shear box by fastening screws.

In some embodiments of the present disclosure, a movable sliding plate and small ball rows are disposed above the top plate of the upper shear box, and the small ball rows are used to change sliding friction between the movable sliding plate and the top plate into rolling friction, so as to reduce friction of the soft rock shear rheological test system.

In some embodiments of the present disclosure, the upper shear body is provided with a pre-clamping plate and a push screw on a same side as the horizontal dynamic load electric cylinder, and the pre-clamping plate and the push screw are used to push the test specimen. The push screw passes through the upper shear body to bear against the pre-clamping plate, and the pre-clamping plate and the test specimen can be pushed by twisting the push screw, so as to make the test specimen press against the upper shear body In some embodiments of the present disclosure, a normal grating ruler and a parallel plate are disposed on lateral sides of the normal static load electric cylinder and the normal loading indenter, and a lower end of the normal grating ruler is in contact with the parallel plate for measuring a vertical displacement. A horizontal grating ruler is arranged on outer sides of the upper shear boxes and the lower shear boxes in a shear direction for measuring a horizontal displacement of the shear box.

In some embodiments of the present disclosure, the test specimen has a cuboid shape, and there are three cylindrical holes with a diameter larger than an outer diameter of the specimen connector prefabricated on the test specimen. During the shear rheological test, the specimen connectors and a wall of the cylindrical hole in the test specimen are bonded by glue.

According to one or more embodiments of the present disclosure, a plunger pump and an accumulator capable of supplying stable high-pressure water are connected to a port of the water/air inflow channel. A flow measuring device is connected at one end of the water/air outflow channel, and the flow measuring device comprises a large flow measuring device and a small flow measuring device. The large flow measuring device uses a flow meter to measure amount of water seeping out, and the small flow measuring device uses an electronic balance to measure amount of water seeping out. There are water pressure sensors disposed at both of a water inlet and a water outlet to monitor water pressure. The water pressure sensors are connected with a micro seepage servo control system to automatically and stably adjust water pressure. A port of the water/air inflow channel can be connected to an air compression pump, and the air compression pump is connected to a micro pneumatic servo control system. An air outlet of the air compression pump is provided with a barometer, and the micro pneumatic servo control system can automatically adjust air pressure.

Compared with the prior art, the soft rock shear rheological test system with simulation of coupled rainfall seepage and blasting vibrations according to the present disclosure has the following technical advantages:

(1) In one or more embodiments of the present disclosure, three cylindrical holes with a diameter larger than the outer diameter of the specimen connector are prefabricated on the test specimen at equal intervals, and the specimen connectors are directly mortised to the cylindrical hole, so that the entire test specimen can be quickly penetrated by high-pressure water, and test efficiency can be improved.

(2) In one or more embodiments of the present disclosure, installation between the specimen connector and the normal load bearing block in the test system according to the present disclosure is simple and easy, and the specimen connector and the test specimen can be glued together. The specimen connectors can be replaced after each group of tests, which is convenient and quick, and can improve test efficiency.

(3) In one or more embodiments of the present disclosure, the water/air channel designed in the test system according to the present disclosure has a simple structure. A water inlet channel and a air inlet channel can be combined into one, which can not only perform soft rock shear rheological tests under high permeability water pressure, but also can be connected to the air compression pump at a port of the water/air channel without disassembling the shear box, so that the test specimen can be dried directly for testing, which can well simulate a dry and wet cycle of the test specimen.

(4) In one or more embodiments of the present disclosure, the pre-clamping plate of the test specimen is provided in the upper shear box of the test system according to the present disclosure. Before the shear rheological test, the pre-clamping plate and the test specimen can be pushed by twisting the push screw so as to make the test specimen and the shear body closely contact, which can effectively avoid deflection of the test specimen during the shearing process due to lacking of close contact between the test specimen and the shear body at initial stage, and improve accuracy of test results.

(5) In one or more embodiments of the present disclosure, a ball row is disposed between the top plate of the upper shear box and the movable slide plate as well as between the upper shear box and the lower shear box in the test system according to the present disclosure, and the slide-rolling row is disposed at bottom of the lower shear box, so that a sliding friction is turned into a rolling friction, which effectively reduces system friction and energy consumption.

(6) In one or more embodiments of the present disclosure, the overall structure of the loading device of the test system according to the present disclosure is scientific and reasonable, and the shear box can ensure sealing of high-pressure water/air. The test system according to the present disclosure can quickly perform dry and wet cyclic operations on the test specimen during the shear rheological test, and the test efficiency is high. Further, because the deflection of the test specimen during the shear process can be avoided, and friction between components of the shear box also can be reduced, so that the test results are more consistent with real situation.

REFERENCE NUMERALS IN THE FIGURES ARE LISTED AS BELOW

1—normal static load electric cylinder, 2—frame, 3—normal grating ruler, 4—parallel plate, 5—horizontal static load electric cylinder, 6—normal loading indenter, 7—vertical roller shaft, 8—movable sliding plate, 9—horizontal grating ruler, 10—reaction post, 11—upper shear box, 12—horizontal dynamic load electric cylinder, 13—lower shear box, 14—slide-rolling row, 15—frame beam, 16—normal dynamic load electric cylinder, 17—support leg, 18—rail mounting frame, 19—moving rail, 20—annular sealing ring, 21—hexagonal socket head plug, 22—normal load bearing block, 23—specimen connector, 24—flat groove, 25—connector sealing ring, 26—test specimen, 27—water/air inflow channel, 28—water/air outflow channel, 29—rectangular sealing strip, 30—push screw, 31—pre-clamping plate, 32—slide-rolling row barrier, 33—small ball row, 34—large ball row, 35—fastening screw, 36—ball barrier, 37—through hole, 38—ball hole, 39—rectangular hole, 40—hexagonal socket head screw, 41—sealing strip, 111—top plate, 112—upper shear body, 131—lower shear body, 132—bottom plate, 141—sliding plate, 142—ball.

DETAILED DESCRIPTION OF EMBODIMENTS

The present disclosure will be further described below with reference to the drawings and specific embodiments. Detailed implementations and specific operating procedures are given in the one or more embodiments, but the protection scope of the present disclosure is not limited to the following embodiments.

Figure 1:
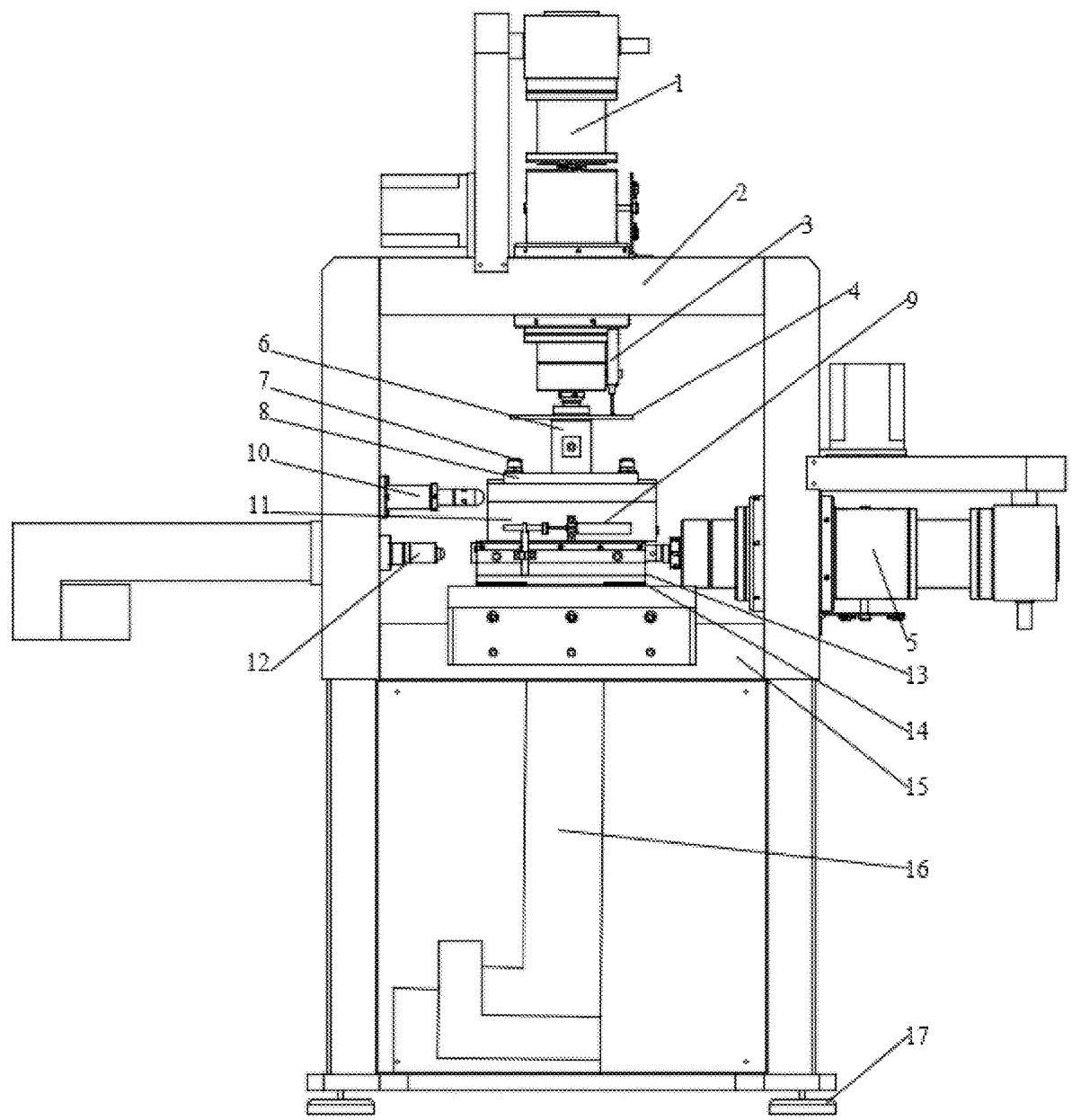
FIG. 1 illustrates a schematic front structural view of a loading device and a shear box in a test system according to one or more embodiments of the present disclosure.
Figure 2:
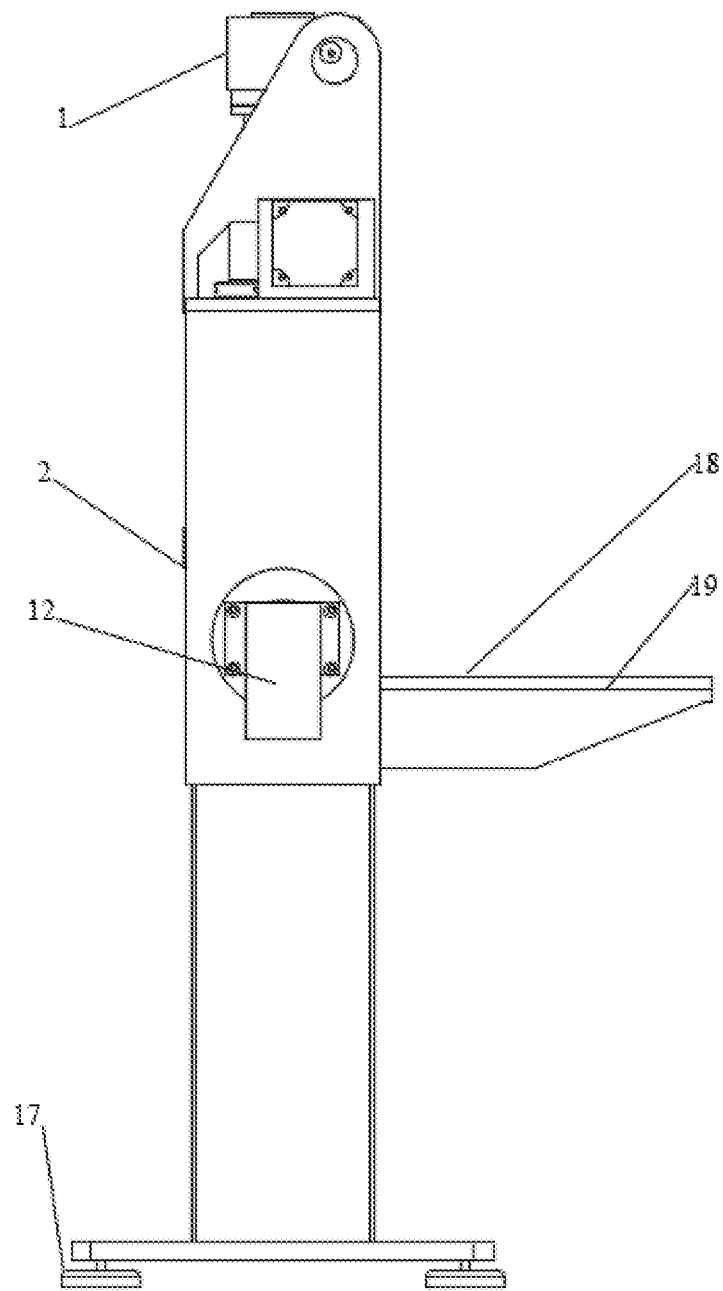
FIG. 2 illustrates a schematic side view of the structure of the loading device in the test system according to one or more embodiments of the present disclosure.
Figure 3:
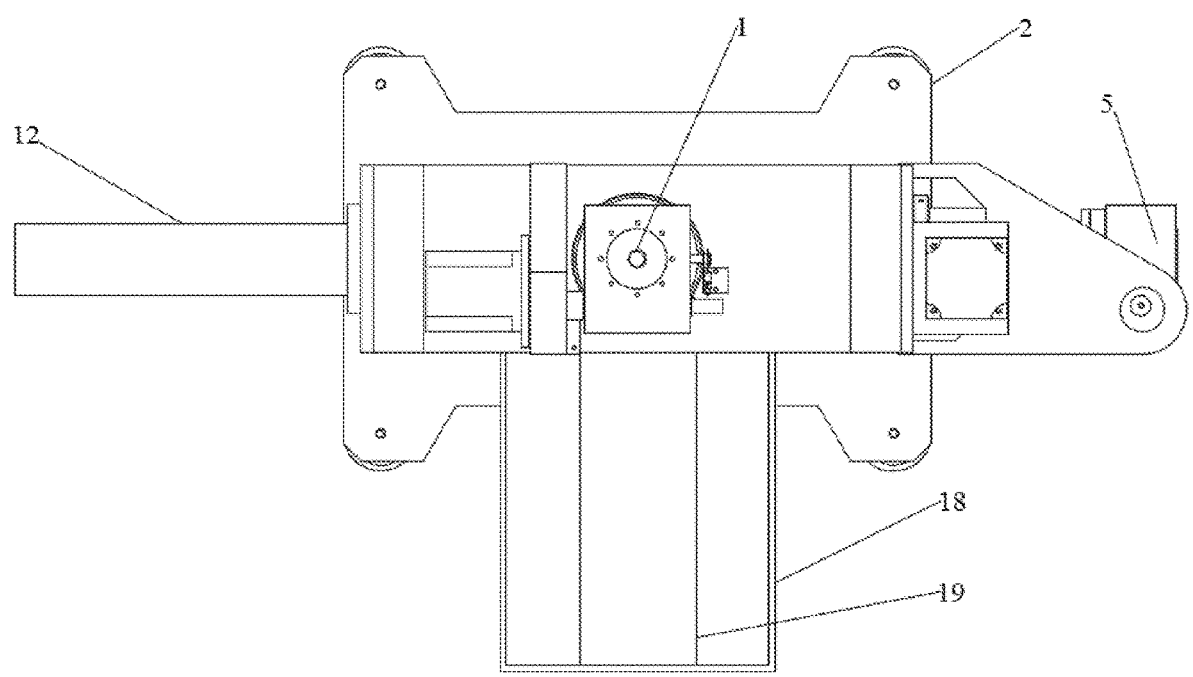
FIG. 3 illustrates a schematic top view of the structure of the loading device in the test system according to one or more embodiments of the present disclosure.

Referring to FIGS. 1 to 3, one or more embodiments of the present disclosure provides a soft rock shear rheological test system with simulation of coupled rainfall seepage and blasting vibrations. The soft rock shear rheological test system according to the present disclosure can be at least provided with a loading device and a shear box. The loading device includes a frame 2, a normal static load electric cylinder 1, a normal dynamic load electric cylinder 16, a horizontal static load electric cylinder 5, a horizontal dynamic load electric cylinder 12 and a reaction post 10. There is a frame beam 15 disposed in the middle of the frame 2, and support legs 17 are disposed at a bottom portion of the frame 2. The normal static load electric cylinder 1 is disposed on a top of the frame 2, and the normal dynamic load electric cylinder 16 is disposed at a lower portion of the frame 2. An indenter of the normal static load electric cylinder 1 and an indenter of the normal dynamic load electric cylinder 16 lie in a same central line. The horizontal static load electric cylinder 5 and the horizontal dynamic load electric cylinder 12 are respectively disposed on both sides of the frame 2, and an indenter of the horizontal static load electric cylinder 5 and an indenter of the horizontal dynamic load electric cylinder 12 lie in a same central line. The reaction post 10 is disposed right over the horizontal dynamic load electric cylinder 12.

Referring to FIGS. 4 to 8, in one or more embodiments of the present disclosure, the shear box can include an upper shear box 11, a lower shear box 13, a normal loading indenter 6, a normal load bearing block 22 and a specimen connector 23. The upper shear box 11 is formed by connecting a top plate 111 and an upper shear body 112 through hexagon socket head cap screws 40. The lower shear box 13 is formed by connecting a lower shear body 131 and a bottom plate 132 through hexagonal socket head cap screws 40. The upper shear box 11 and the lower shear box 13 are tightly pressed together by a vertical roller shaft 7. Internal threaded connection holes are provided on both sides of the lower shear box 13, and through holes 37 are disposed on both sides of the upper shear box 11. The vertical roller shaft 7 passes through the through holes 37 on both sides of the upper shear box 11 and engages the lower shear box 13 through the internal threaded connection holes. During shear rheological test, the vertical roller shaft 7 is capable of moving with the lower shear box 13 in a tangential direction within a range of the through hole 37. The upper shear boxes 11 and lower shear boxes 13 are fixedly connected to form a cuboid cavity inside inner walls of the upper shear boxes 11 and the lower shear boxes 13 for placing a test specimen. The upper shear box 11 is in contact with one end of the reaction post 10, and the reaction post 10 is used to keep the upper shear box 11 stationary in a shear direction during the shear rheological test. The lower shear body 131 of the lower shear box 13 is at a same height as the indenter of the horizontal static load electric cylinder 5.

Figure 4:
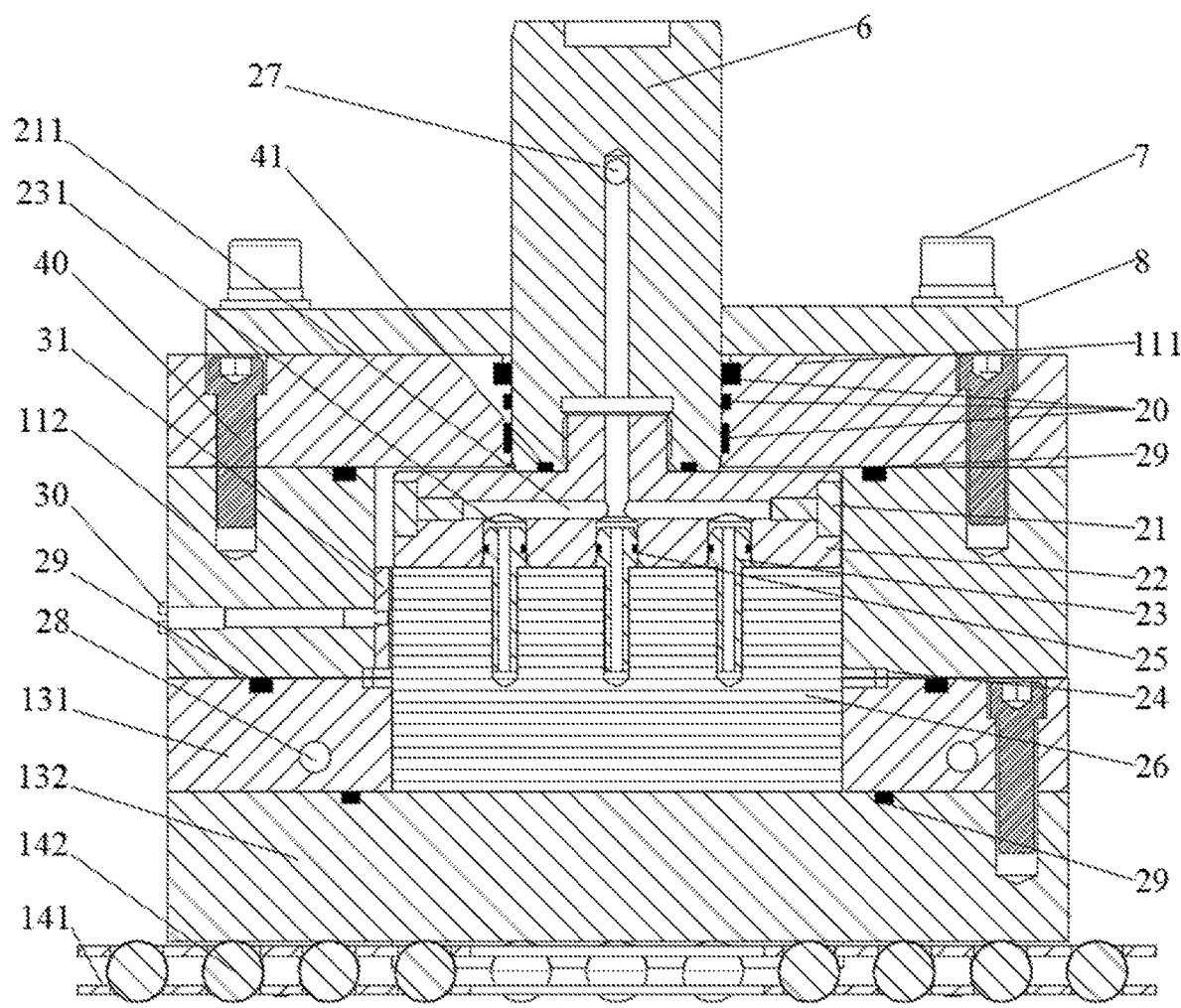
FIG. 4 illustrates a schematic front cross-sectional view of the structure of the shear box according to one or more embodiments of the present disclosure.
Figure 5:
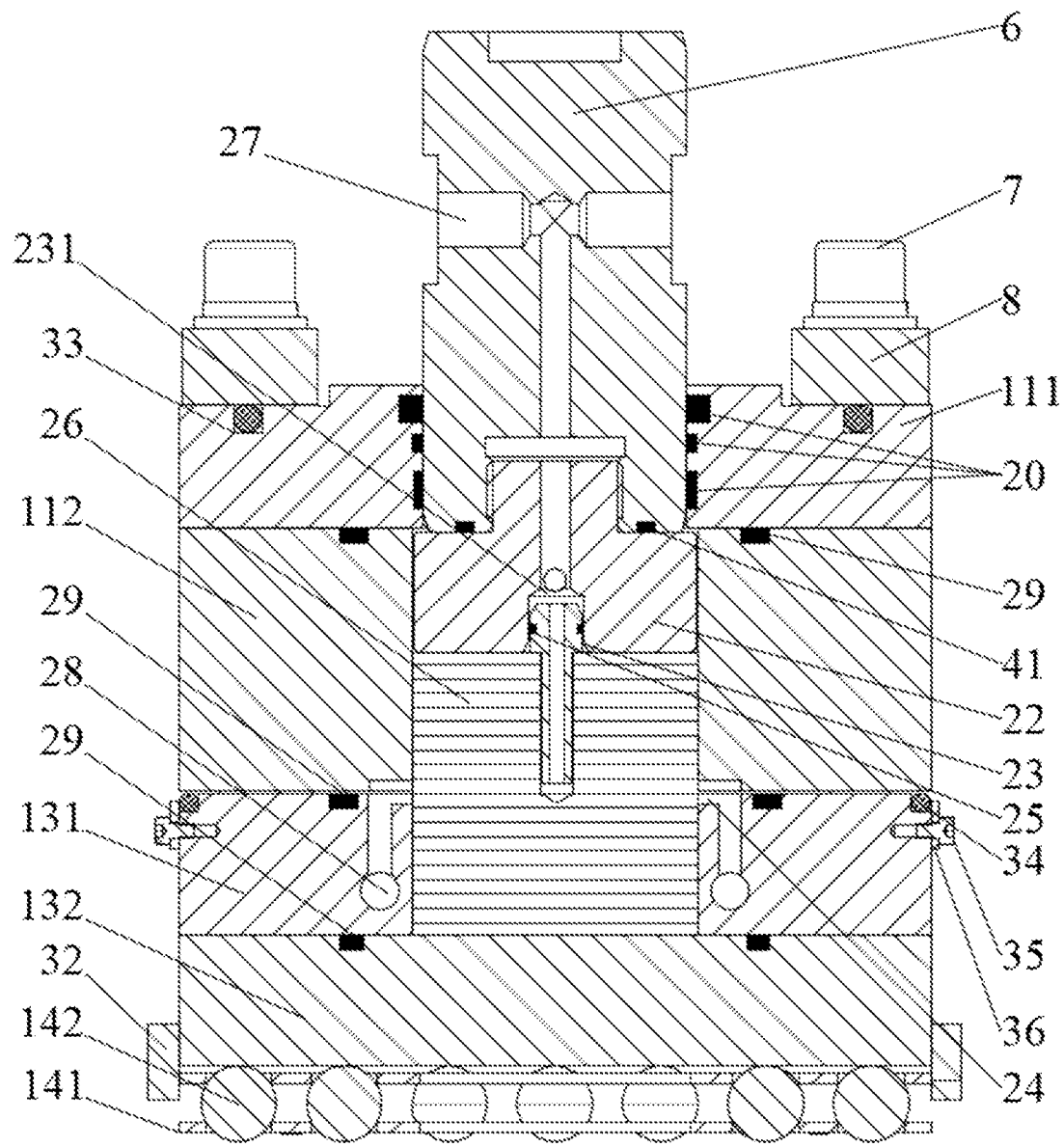
FIG. 5 illustrates a schematic side cross-sectional view of the structure of the shear box according to one or more embodiments of the present disclosure.
Figure 6:
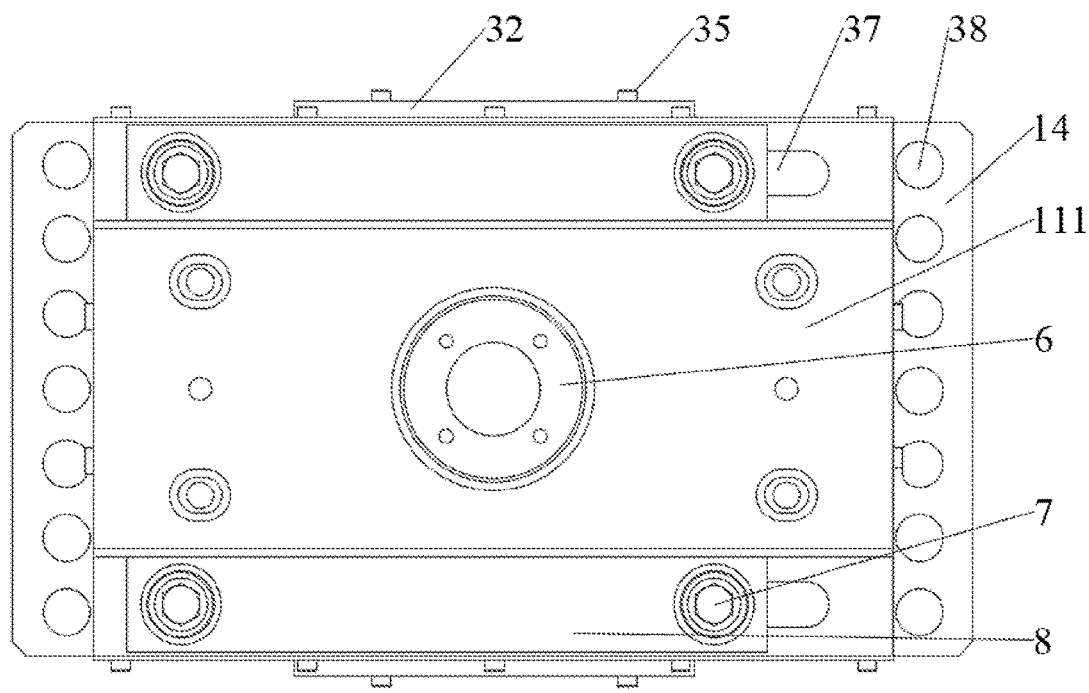
FIG. 6 illustrates a schematic top view of the structure of the shear box according to one or more embodiments of the present disclosure.
Figure 7:
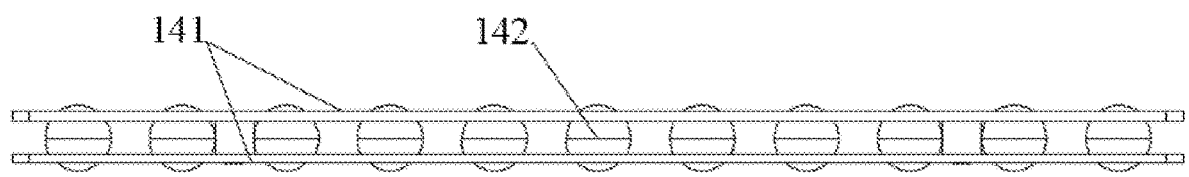
FIG. 7 illustrates a schematic front view of the structure of the slide-rolling row according to one or more embodiments of the present disclosure.
Figure 8:
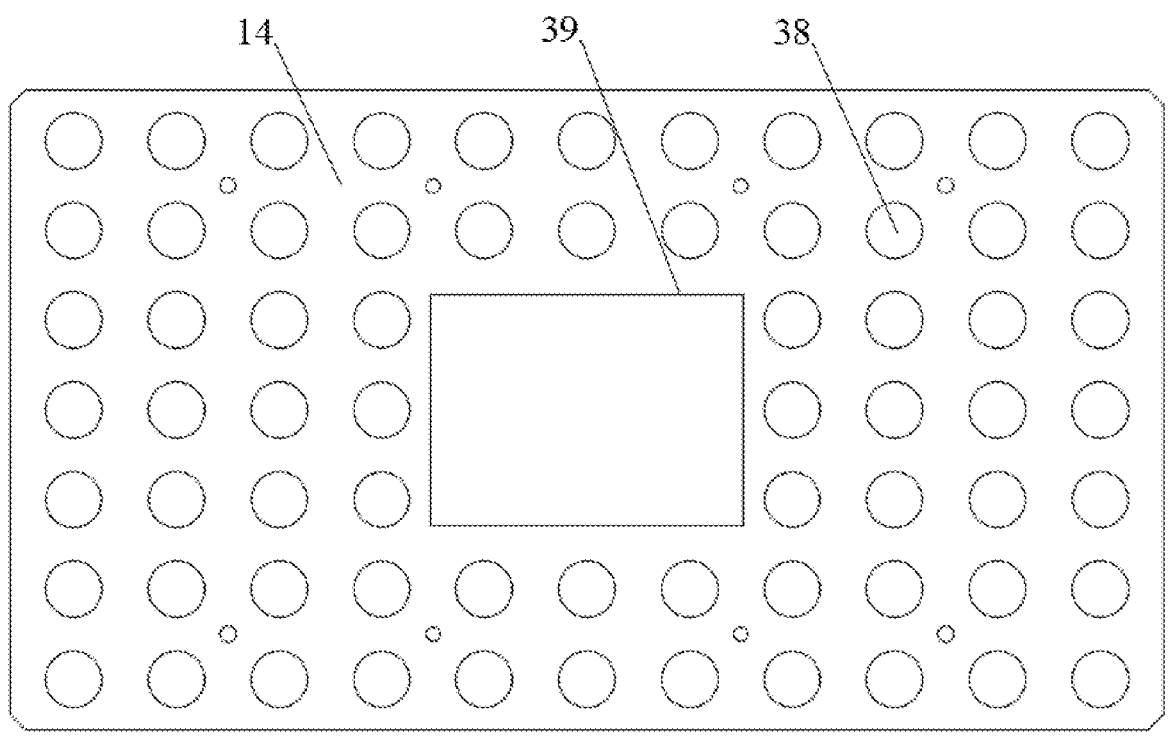
FIG. 8 illustrates a schematic top view of the structure of the slide-rolling row according to one or more embodiments of the present disclosure.

Referring to FIGS. 4 and 5, the top plate 111 of the upper shear box 11 is formed with a circular through hole, and the normal loading indenter 6 passes through the circular through hole and presses on the normal load bearing block 22. A top portion of the normal loading indenter 6 is formed with an upper groove for mortising a spherical universal indenter of the normal static load electric cylinder 1 to apply a normal load. A lower portion of the normal loading indenter 6 is provided with a lower groove for connecting the normal load bearing block 22. The normal load bearing block 22 is formed in a protrusion shape, and a projected head of the protrusion shape of the normal load bearing block 22 is fitted into the lower groove of the normal loading indenter 6. Two shoulders of the normal load bearing block 22 are in contact with the top plate, and lateral sides of the normal load bearing block 22 are in contact with inner walls of the upper shear body 112. The normal loading indenter 6 is provided with a inflow channel 27 communicating with outside, and the inflow channel 27 turns into a horizontal water/air channel 211 after the inflow channel 27 is extended vertically downward from the normal loading indenter 6 and enters the normal load bearing block 22. Outlets at both ends of the horizontal water/air channel 211 are blocked with hexagonal socket head plugs 21. Three water/air holes 231 are formed at equal intervals on a lower portion of the horizontal water/air channel 211. The specimen connectors 23 are mounted respectively in the three water/air holes 231. The specimen connectors 23 and the water/air holes 231 are all provided with chamfers, and a connector sealing ring 25 is disposed on contact part of the specimen connectors 23 and the water/air holes 231 for sealing against high-pressure water/air. Another end of the specimen connector 23 is directly mortised inside the test specimen 26.

In one or more embodiments of the present disclosure, the upper shear body 112 is provided with a flat groove 24. The flat groove 24 is at a connection of the upper shear body 112 and the lower shear body 131, and surrounds the cuboid cavity. The flat groove 24 serves to avoid damage to a shear surface of the test specimen 26, and water/air outflow channels 28 communicating with outside of the shear box are disposed inside the flat groove 24.

In one or more embodiments of the present disclosure, a slide-rolling row 14 is disposed below the lower shear box 13. The slide-rolling row 14 is provided with an upper sliding plate 141 and a lower sliding plate 141. The upper sliding plate 141 and the lower sliding plate 141 are provided with ball holes 38 for placing balls 142, and there is a rectangular hole 39 in the middle of the slide-rolling row 14. Slide-rolling row barriers 32 are disposed on both sides of the slide-rolling row 14, and the slide-rolling row barriers 32 are fastened to both sides of the bottom plate 132 through fastening screws 35 to limit moving range of the slide-rolling row 14.

In one or more embodiments of the present disclosure, a rail mounting frame 18 is fixed on the frame beam 15, and the rail mounting frame 18 is provided with a moving rail 19. There is an opening in the middle of the frame beam. The normal dynamic load electric cylinder 16 passes through the opening and the rectangular hole 39 in the middle of the slide-rolling row 14, and then contact the bottom plate 132 of the lower shear box 13.

In one or more embodiments of the present disclosure, three annular sealing rings 20 are disposed between the top plate 111 and the normal loading indenter 6 for sealing between the top plate 111 and the normal loading indenter 6 so as to prevent leakage of high-pressure water/air from the a connection between the top plate 111 and the normal loading indenter 6. One sealing strip 41 is disposed between bottom portion of the normal loading indenter 6 and the normal load bearing block 22 to seal between the normal loading indenter 6 and the normal load bearing block 22, so as to prevent leakage of high-pressure water/air from the a connection between the normal loading indenter 6 and the normal load bearing block 22. There are rectangular sealing strips 29 disposed between the top plate 111 of the upper shear box 11 and the upper shear body 112 of the upper shear box 11, between the upper shear boxes 11 and lower shear boxes 13, and between the lower shear body 131 of the lower shear box 13 and the bottom plate 132 of the lower shear box 13.

In one or more embodiments of the present disclosure, large ball rows 34 and ball barriers 36 are disposed at both sides of the lower shear body 131 for reducing friction between the upper shear boxes 11 and lower shear boxes 13. The ball barriers 36 are fastened to the lower shear body 131 fastening screws 35.

A movable sliding plate 8 and small ball rows 33 are disposed above the top plate 111 of the upper shear box 11. The small ball rows 33 are used to change sliding friction between the movable sliding plate 8 and the top plate 111 into rolling friction, so as to reduce friction of the soft rock shear rheological test system.

In one or more embodiments of the present disclosure, the upper shear body 112 is provided with a push screw 30 and a pre-clamping plate 31 for pushing the test specimen 26 on a same side as the horizontal dynamic load electric cylinder 12. The push screw 30 passes through the upper shear body 112 to bear against the pre-clamping plate 31. The pre-clamping plate 31 and the test specimen 26 can be pushed by twisting the push screw 30, so as to make the test specimen 26 press against the upper shear body 112 on another side.

In one or more embodiments of the present disclosure, a normal grating ruler 3 and a parallel plate 4 are disposed on lateral sides of the normal static load electric cylinder 1 and the normal loading indenter 6. The normal grating ruler 3 is used to measure vertical displacement. A lower end of the normal grating ruler 3 is in contact with the parallel plate 4. A horizontal grating ruler 9 is arranged on outer sides of the upper shear box 11 and the lower shear box 13 in a shear direction for measuring a horizontal displacement of the shear box.

In one or more embodiments of the present disclosure, the test specimen 26 has a cuboid shape, and there are cylindrical holes with a diameter larger than an outer diameter of the specimen connector 23 prefabricated on the test specimen 26. During the shear rheological test, the specimen connector 23 and a wall of the cylindrical hole in the test specimen 26 are bonded by glue.

The specific steps of using the soft rock shear rheological test system with simulation of coupled rainfall seepage and blasting vibrations according to one or more embodiments of the present disclosure are as follows:

Step (1): Test Specimen Preparation

An original rock specimen taken from site is sealed with plastic film and placed in a wooden box, and then concrete is injected to fill gaps between the rock specimen and the wooden box. After the concrete is completely hardened, a core machine is used to take core of the original rock specimen. Finally, the core of the original rock specimen is carefully polished into a 150 mm×75 mm×75 mm of cuboid rock specimen 26 with a grinder. Three cylindrical holes with a diameter of 4 mm and a depth of 37.5 mm are drilled at equal intervals along centerline of the top of the test specimen parallel to the shear direction, and inside of the cylindrical holes are cleaned.

Step (2): Installation of the Test Specimen and the Shear Box

The shear box on the slide-rolling row 14 is pushed out of the frame 2 along the moving rail 19, and threads of the vertical roller shaft 7 are loosened. The upper shear box 11 and the lower shear box 13 are separated.

A lifting device (not shown in the figure) is used to lift the upper shear box 11, the normal loading indenter 6 connected with the upper shear box, and the normal load bearing block 22 off from the frame 2.

The test specimen 26 is placed in the lower shear box 13 with half of top portion of the test specimen 26 being exposed. The rectangular sealing strip 29 on the lower shear box 13 is mounted well, and then the three specimen connectors 23 are mounted onto the normal load bearing block 22. Outer walls of the specimen connectors 23 and inner walls of three prefabricated holes in the test specimen 26 are coated with glue. The specimen connectors 23 are aligned with the prefabricated cylindrical holes of the test specimen 26. The upper shear box 11, the normal load bearing 22 and the normal loading indenter 6 are lowered down to make sure the upper shear box 11 and the lower shear box 13 are aligned on the four sides. The hexagon socket head cap screws 40 are tightened to make the top plate 111 and the upper shear body 112 tightly pressed together. The movable sliding plate 8 and the vertical roller shaft 7 are installed so that the vertical roller shaft 7 passes through the through holes 37 at both sides of the upper shear box 11 and engages with the lower shear box 13 through the internal threaded connection holes at the both sides of the lower shear box 13. The vertical roller shafts 7 are tightened to make the upper shear box 11 and the lower shear box 13 tightly pressed together. The push screw 30 can be twisted to push the pre-clamping plate 31 and the test specimen 26 to make the test specimen 26 press against the upper shear body 112 on another side. Then the shear box on the slide-rolling row 14 is pushed into the frame 2, so that the shear box enters predetermined test position.

Step (3): Connection Between the Test System and External Devices

A plunger pump and an accumulator capable of supplying stable high-pressure water are connected on an end of the water/air inflow channel 27, and a flow measuring device is connected on an end of the water/air outflow channel 28 to measure amount of seepage water. Water pressure sensors are mounted at each end of the water inlet and the water outlet to monitor water pressure. The water pressure sensors are connected with a micro seepage servo control system to automatically and stably adjust water pressure. A water inlet pipe is connected to the water/air inflow channel 27, and one end of a water outlet pipe is connected to the water/air outflow channel 28, and another end of the water outlet pipe is connected to the flow measuring device. The step (3) further includes checking whether the external devices as well as the loading devices and the shear box in the test system according to the present disclosure are well connected.

Step (4): Performing the Soft Rock Shear Rheological Test

The step (4) includes turning on an external water/air inflow valve and an external water/air outflow valve. The step (4) further includes turning on external measuring devices used in the test and the loading devices used in the system according to the present disclosure. The loading devices can include: the normal static load electric cylinder 1, the normal dynamic load electric cylinder 16, the horizontal static load electric cylinder 5, and the horizontal dynamic load electric cylinder 12.

Loading mode, water pressure and other parameters are adjusted according to established test plan. Shear stress and shear displacement are collected and recorded through the test system according to the present disclosure. Variation of the shear displacement over time in the data acquisition system is watched. The following parameters including shear stress, shear displacement, normal stress, and normal displacement can be dynamically determined.

When it is necessary to simulate influences of a dry and wet cycle on shear rheological effect of the test specimen, ports of the water/air inflow channel 27 can be connected to an air compression pump without disassembling the shear box, so that the test specimen can be directly air-dried. The air compression pump can be connected to the micro pneumatic servo control system, and an air outlet of the air compression pump can be provided with a barometer, so that the micro pneumatic servo control system can automatically adjust air pressure.

The overall structure of the test system according to the present disclosure is scientific and reasonable. The shear box can ensure sealing of high-pressure water/air. The specimen connector 23 is one-time consumable, and the specimen connector 23 can be easily replaced together with the test specimen 26 after each group of tests, so that test efficiency is high. The test system according to the present disclosure can conveniently and quickly perform dry and wet cycle operations on the test specimen 26. The design of the push screw 35 and the pre-clamping plate 31 can prevent the test specimen 26 from shifting during the shear rheological test, and the design of the large ball row 34, the small ball row 33 and the slide-rolling row 14 reduces internal friction of the test system according to the present disclosure, making the shear rheological test results more accurate and more consistent with the real situation.

The invention claimed is:

1. A soft rock shear rheological test system with simulation of coupled rainfall seepage and blasting vibrations, which is at least provided with a loading device and a shear box;
   wherein, the loading device includes a frame, a normal static load electric cylinder, a normal dynamic load electric cylinder, a horizontal static load electric cylinder, a horizontal dynamic load electric cylinder and a reaction post;
   a frame beam is disposed at the middle portion of the frame, and support legs are disposed at a bottom portion of the frame;
   the normal static load electric cylinder is disposed on a top of the frame, and the normal dynamic load electric cylinder is disposed on a lower portion of the frame;
   an indenter of the normal static load electric cylinder and an indenter of the normal dynamic load electric cylinder lie in a same central line;
   the horizontal static load electric cylinder and the horizontal dynamic load electric cylinder are disposed on both sides of the frame, and an indenter of the horizontal static load electric cylinder and an indenter of the horizontal dynamic load electric cylinder lie in a same central line;
   the reaction post is disposed right over the horizontal dynamic load electric cylinder;
   the shear box includes an upper shear box, a lower shear box, a normal loading indenter, a normal load bearing block and specimen connectors;
   the upper shear box is formed by connecting a top plate and an upper shear body through hexagon socket head cap screws, and the lower shear box is formed by connecting a lower shear body and a bottom plate through hexagon socket head cap screws;
   the upper shear box and the lower shear box are tightly pressed together by a vertical roller shaft, and internal threaded connection holes are disposed on both sides of the lower shear box;
   through holes are disposed on both sides of the upper shear box, and the vertical roller shaft passes through the through holes on both sides of the upper shear box and engages the lower shear box through the internal threaded connection holes;
   during shear rheological test, the vertical roller shaft is capable of moving with the lower shear box in a tangential direction within a range of the through hole;
   the upper shear boxes and lower shear boxes are fixedly connected to form a cuboid cavity inside inner walls of the upper shear boxes and the lower shear boxes for placing a test specimen;
   the upper shear box is in contact with one end of the reaction post, and the lower shear body of the lower shear box is at a same height as the indenter of the horizontal static load electric cylinder;
   the top plate of the upper shear box is formed with a circular through hole, and the normal loading indenter passes through the circular through hole and presses on the normal load bearing block;
   a top portion of the normal loading indenter is formed with an upper groove for mortising a spherical universal indenter of the normal static load electric cylinder to apply a normal load;
   a lower portion of the normal loading indenter is provided with a lower groove for connecting the normal load bearing block, and the normal load bearing block has a protrusion shape;
   a projected head of the protrusion shape of the normal load bearing block is fitted in the lower groove of the normal loading indenter, and two shoulders of the normal load bearing block are in contact with the top plate of the upper shear box;
   lateral sides of the normal load bearing block are in contact with inner walls of the upper shear body, and the normal loading indenter is provided with an inflow channel communicating with outside;
   the inflow channel has a horizontal portion, connected to a vertical portion that extends downward from the normal loading indenter, and enters the normal load bearing block;
   outlets at both ends of the horizontal portion are blocked with hexagonal socket head plugs, and three holes are formed at equal intervals on a lower portion of the horizontal portion;
   the specimen connectors are mounted in the three holes;
   the specimen connectors and the holes are all provided with chamfers, and a connector sealing ring is disposed on contact part of one end of the specimen connector and the hole for sealing against a high-pressure flow;
   another end of the specimen connector is directly mortised inside the test specimen;
   the upper shear body is provided with a flat groove; the flat groove is at a connection of the upper shear body and the lower shear body, and surrounds the cuboid cavity;
   the flat groove serves to avoid damage to a shear surface of the test specimen, and outflow channels communicating with outside of the shear box are disposed inside the flat groove;
   a slide-rolling row is disposed below the lower shear box, and the slide-rolling row is provided with an upper sliding plate and a lower sliding plate;
   the upper sliding plate and the lower sliding plate are provided with ball holes for placing balls, and there is a rectangle hole in the middle of the slide-rolling row;
   slide-rolling row barriers are disposed on both sides of the slide-rolling row, and the slide-rolling row barriers are fastened to both sides of the bottom plate through fastening screws to limit moving range of the slide-rolling row;
   a rail mounting frame is fixed on the frame beam, and the rail mounting frame is provided with a moving rail; there is an opening in the middle of the frame beam; and
   the normal dynamic load electric cylinder passes through the opening and the rectangular hole in the middle of the slide-rolling row, and then contact the bottom plate of the lower shear box.

2. The soft rock shear rheological test system of claim 1, wherein three annular sealing rings are disposed between the top plate and the normal loading indenter for sealing between the top plate and the normal loading indenter so as to prevent leakage of the high-pressure flow from a connection between the top plate and the normal load bearing block;

One sealing strip is disposed between bottom portion of the normal loading indenter and the normal load bearing block to seal between the normal loading indenter and the normal load bearing block, so as to prevent leakage of the high-pressure flow from a connection between the normal loading indenter and the normal load bearing block; and there are rectangular sealing strips disposed between the top plate of the upper shear box and the upper shear body of the upper shear box, between the upper shear boxes and lower shear boxes, and between the lower shear body of the lower shear box and the bottom plate of the lower shear box.

3. The soft rock shear rheological test system of claim 1, wherein large ball rows and ball barriers are disposed at both sides of the lower shear body for reducing friction between the upper shear box and the lower shear box, and the ball barriers are fastened to the lower shear box by fastening screws.

4. The soft rock shear rheological test system of claim 1, wherein a movable sliding plate and small ball rows are disposed above the top plate of the upper shear box, and the small ball rows are used to change sliding friction between the movable sliding plate and the top plate into rolling friction, so as to reduce friction of the soft rock shear rheological test system.

5. The soft rock shear rheological test system of claim 1, wherein the upper shear body is provided with a pre-clamping plate and a push screw on a same side as the horizontal dynamic load electric cylinder, and the pre-clamping plate and the push screw are used to push the test specimen; and the push screw passes through the upper shear body to bear against the pre-clamping plate, and the pre-clamping plate and the test specimen can be pushed by twisting the push screw, so as to make the test specimen press against the upper shear body.

6. The soft rock shear rheological test system of claim 1, wherein a normal grating ruler and a parallel plate are disposed on lateral sides of the normal static load electric cylinder and the normal loading indenter, and a lower end of the normal grating ruler is in contact with the parallel plate for measuring a vertical displacement; and a horizontal grating ruler is arranged on outer sides of the upper shear boxes and the lower shear boxes in a shear direction for measuring a horizontal displacement of the shear box.

7. The soft rock shear rheological test system of claim 1, wherein the test specimen has a cuboid shape, and there are three cylindrical holes with a diameter larger than an outer diameter of the specimen connector prefabricated on the test specimen; and during the shear rheological test, the specimen connector and a wall of the cylindrical hole in the test specimen are bonded by glue.

\* \* \* \* \*